(12) United States Patent
Bazis (10) Patent No.: US 10,919,679 B1
(45) Date of Patent: Feb. 16, 2021

(54) MULTIPLE COMPARTMENT CONTAINER ASSEMBLY

(71) Applicant: FLPSDE, LLC, Elkhorn, NE (US)

(72) Inventor: Ben Bazis, Elkhorn, NE (US)

(73) Assignee: FLPSDE, LLC, Elkhorn, NE (US)

( * ) Notice: Subject to any disclaimer, the term of this patent is extended or adjusted under 35 U.S.C. 154(b) by 281 days.

(21) Appl. No.: 15/878,520

(22) Filed: Jan. 24, 2018

Related U.S. Application Data (63) Continuation-in-part of application No. 14/733,361, filed on Jun. 8, 2015, now abandoned.

(51) Int. Cl.
| | |
|---|---|
| *B65D 77/04* | (2006.01) |
| *B65D 35/22* | (2006.01) |
| *B65D 35/44* | (2006.01) |
| *B29C 49/06* | (2006.01) |
| *B29C 49/20* | (2006.01) |
| *B29K 67/00* | (2006.01) |
| *B29K 23/00* | (2006.01) |

(52) U.S. Cl.
CPC .......... *B65D 77/0426* (2013.01); *B29C 49/06* (2013.01); *B29C 49/20* (2013.01); *B65D 35/22* (2013.01); *B65D 35/44* (2013.01); *B29K 2023/065* (2013.01); *B29K 2023/0633* (2013.01); *B29K 2023/12* (2013.01); *B29K 2067/003* (2013.01); *B65D 2577/205* (2013.01)

(58) Field of Classification Search
CPC ......... B65D 77/0486; B65B 3/04; B65B 7/00; B65B 50/26; B65B 50/88; B65B 70/88; B65B 50/28
USPC .......................................... 53/58, 59, 67, 355
See application file for complete search history.

(56) References Cited

U.S. PATENT DOCUMENTS

| | | | | |
|---|---|---|---|---|
| 933,444 | A * | 9/1909 | Henke, Jr. ............. | B65D 1/265 220/506 |
| 2,568,029 | A * | 9/1951 | Seemar ................. | B65D 81/32 604/416 |
| 2,615,448 | A * | 10/1952 | Fields ................ | B65D 51/2885 604/416 |
| 3,726,106 | A * | 4/1973 | Jaeger ..................... | F25D 3/107 62/294 |
| 3,856,138 | A * | 12/1974 | Maekawa .......... | B65D 81/3222 206/221 |
| 3,920,120 | A * | 11/1975 | Shveda .................. | B65D 51/24 206/217 |
| 4,163,517 | A * | 8/1979 | Kappler ................. | B65D 59/00 229/4.5 |
| 4,584,848 | A * | 4/1986 | Barnett ................... | F25D 3/107 220/506 |
| 4,603,784 | A * | 8/1986 | Chang ...................... | A61J 9/00 215/10 |

(Continued)

*Primary Examiner* — Nathaniel C Chukwurah
*Assistant Examiner* — Lucas E. A. Palmer
(74) *Attorney, Agent, or Firm* — Mallory M. Henninger; Advent, LLP (57) ABSTRACT

Described herein is a multiple compartment container assembly which allows multiple distinct substances to be separately stored and/or consumed and/or dispensed. The separate compartments are accessed through apertures located at opposing ends of the container assembly, each aperture having a separate, leak resistant closure. A user may select which of the compartments to access by opening one or another of the closures.

21 Claims, 9 Drawing Sheets

(56) References Cited

U.S. PATENT DOCUMENTS

| | | | | |
|---|---|---|---|---|
| 4,757,916 A * | 7/1988 | Goncalves | ......... | B65D 81/3211 222/83 |
| 4,805,789 A * | 2/1989 | Lancesseur | ........ | B65D 81/3205 215/6 |
| 5,499,738 A * | 3/1996 | Burleigh | .................. | B65D 1/04 215/395 |
| 5,603,401 A * | 2/1997 | Brunner | ................ | B65D 25/16 206/204 |
| 6,116,439 A * | 9/2000 | Yaniv | .................... | B65D 11/04 215/10 |
| 6,135,275 A * | 10/2000 | Kelders | ............. | B65D 81/3211 206/221 |
| 6,196,412 B1 * | 3/2001 | Cattell | ................... | B65D 25/04 220/254.2 |
| 6,363,978 B2 * | 4/2002 | Castillo | ................. | B65D 51/28 141/100 |
| 6,415,624 B1 * | 7/2002 | Connors | ............ | B65D 21/0237 62/457.3 |
| 6,419,081 B1 * | 7/2002 | Ross | .................. | A47G 19/2205 206/217 |
| 6,427,863 B1 * | 8/2002 | Nichols | ................... | A47J 39/00 220/23.86 |
| 6,739,731 B2 * | 5/2004 | Katzman | ................ | B65D 23/14 206/219 |
| 7,004,339 B2 * | 2/2006 | Renz | ....................... | A61J 9/001 215/11.1 |
| 7,082,784 B2 * | 8/2006 | Roth | ........................ | A45F 3/16 220/23.87 |
| 7,117,684 B2 * | 10/2006 | Scudder | .................... | F25D 5/02 62/4 |
| 7,287,656 B2 * | 10/2007 | Guilford, III | ............. | A61J 9/00 215/11.1 |
| 7,942,145 B2 * | 5/2011 | Palena | ................. | A47J 36/2416 126/263.03 |
| 8,875,926 B2 * | 11/2014 | Grajqevci | ............ | B65D 47/265 206/219 |
| 9,187,231 B1 * | 11/2015 | Burtner | .................. | B65D 23/12 |
| 9,408,778 B2 * | 8/2016 | Al-Hakim | ........... | B65D 81/3211 |
| 9,851,476 B2 * | 12/2017 | Cole | ......................... | G02B 3/08 |
| 10,427,835 B1 * | 10/2019 | Leslie-Shattenkirk | ....................... | B65D 1/06 |
| 2002/0036213 A1 * | 3/2002 | De Laforcade | .... | B65D 81/3211 222/132 |
| 2003/0192894 A1 * | 10/2003 | Munns | ...................... | B65D 1/06 220/505 |
| 2005/0025556 A1 * | 2/2005 | Guillaume | ............. | A47L 23/05 401/1 |
| 2008/0179311 A1 * | 7/2008 | Koro | .................... | A47J 36/2416 219/430 |
| 2008/0251063 A1 * | 10/2008 | Palena | ...................... | A61J 9/02 126/263.09 |
| 2009/0272747 A1 * | 11/2009 | Kalaouze, Jr. | ...... | B65D 81/3222 220/500 |
| 2009/0308873 A1 * | 12/2009 | Kim | ........................ | B65D 51/28 220/524 |
| 2010/0237079 A1 * | 9/2010 | Sharon | .................... | B65D 25/08 220/502 |
| 2010/0308058 A1 * | 12/2010 | Moskow | ............. | B65D 83/0011 220/524 |
| 2012/0024863 A1 * | 2/2012 | Cho | ....................... | B65D 77/0493 220/506 |
| 2012/0037669 A1 * | 2/2012 | Goetz | .................... | A47G 19/34 222/456 |
| 2013/0075287 A1 * | 3/2013 | Sharon | ................ | B65D 81/3222 206/219 |

* cited by examiner

MULTIPLE COMPARTMENT CONTAINER ASSEMBLY

CROSS-REFERENCE TO RELATED APPLICATIONS

This application claims priority to and is a Continuation-in-Part of U.S. patent application Ser. No. 14/733,361, filed on Jun. 8, 2015, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The invention generally relates to containers for holding and dispensing substances of choice. More specifically, it relates to containers that include an outer compartment and an inner compartment located within the outer compartment.

2. Description of Related Art

The world generally desires convenience and efficiency. In regard to containers, companies and individuals have sought to provide this. Cans were designed to hold food, beverages, or other substances. Bottles, bags, boxes, pouches, and more were also designed. A user can now pick up potato chips in a bag and carry them along conveniently. The same goes for water contained in a bottle. However, a user interested in a bag of chips and a bottle of water, for example, has to carry two separate containers.

On a mountain bike ride, for instance, this has to be planned for and decreases convenience and efficiency. The rider loses mobility by carrying two containers and time by having to determine how to carry both containers. On the trail, access to the contents of the two containers can be cumbersome and require the rider to stop for extended periods of time. This hinders the workout and sometimes, the general enjoyment of the ride. Furthermore, depending on the type of container, resealing may not be a viable option, forcing the rider to drink or eat all of the contents at once and limiting replenishment of essential nutrients depleted during the workout.

Shampoo and conditioner, for example, have become staples in modern hair care. However, having two separate bottles takes up space. To remedy this, shampoo and conditioner have been mixed and provided as a product in a single container. However, because shampoo and conditioner are different products and have different purposes, this approach is not as useful or desirable as having easy access to the separate products for hair care.

Multiple compartment containers are known in the art; however, none has separate access points/apertures on opposing ends for access to one or another of the compartments and the ability to be supported on a surface in a stable manner by caps positioned at both ends of the container. For example, patent publication number US2009/0272747 describes a beverage can with the proposed ability to hold multiple liquids, open several compartments from the top of the container simultaneously, and facilitate mixing. Whereas patent publication number US2012/0055818 describes a design that proposes to allow the consumption and mixing of multiple beverages simultaneously or separately from access points on the top of the container. Patent publication numbers US2013/0171303 and 2011/0094904 propose designs to hold a food and liquid item from access points on the side and/or top of the container.

BRIEF SUMMARY OF THE INVENTION

An objective of the multiple compartment container assembly of the invention is to accomplish one or more of the following: the ability to hold not only multiple beverage and/or food type items, but also other contents including liquids, solids, semi-solids, gels, and/or gasses; the ability to be repeatedly opened and re-sealed; the ability to be reused; the ability to hold separate contents without mixing; the ability to have separate access points on opposite ends of the container assembly; the ability to stand stably on a flat surface; and the ability to accommodate an active lifestyle.

Therefore, disclosed herein is a container assembly having a plurality of compartments, with at least one inner compartment and one outer compartment. The container assembly having a first portion and a second portion which are located opposite each other. For purposes of simplification in description of the invention herein, these oppositely oriented portions are referred to as first and second end portions. However, this is not meant to be limiting and it is to be understood that while the figures exemplify a container assembly where the opposite portions are oriented at top and bottom of the container assembly, the scope of the invention extends to such other shapes, as long as the apertures are located opposite each other on opposite aspects of the container assembly. Each of the opposite end portion of the container assembly has at least one aperture. The first end aperture provides access to the outer compartment and the second end aperture provides access to the at least one inner compartment. The apertures preferably have leak-resistant closures. In some embodiments, the entire end of the container may function as an aperture with leak-resistant closure. The at least one inner compartment and the outer compartment are separate from each other and can thereby hold separate contents without mixing and the contents can be separately added and/or dispensed. The outer compartment and inner compartment have separate apertures and the separate apertures are located on opposing ends of the container. The separate apertures enable the user to selectively access one of the compartments and, by reorienting the container assembly, the user may readily access another of the compartments.

Further disclosed herein is a method of using the container assembly of the invention, by: opening a leak-resistant closure, thus obtaining access to one of the compartments; adding a substance to that compartment through its aperture; and closing the closure for that aperture. This same process may be repeated for the other separate compartments. When it is desired to dispense the contents of a compartment, the leak-resistant closure for that compartment may be opened and the contents dispensed through the aperture. Likewise, this process may be repeated for any other of the compartments.

The discovery of the present multiple compartment container assembly makes it possible to have a single container that can separately hold and separately dispense contents of at least two compartments from opposite ends of the container.

Another embodiment of container assembly in accordance with the invention described herein includes an outer compartment, an inner compartment, a first closure and a second closure. The outer compartment has a first end and a second end. The outer compartment defines an outer cavity that is accessible through a first opening at the first end of the outer compartment and through a second opening at the second end of the outer compartment. The inner compartment has a first end and a second end. The inner compartment defines an inner cavity that is accessible through a third opening at the first end of the inner compartment. The inner compartment is configured for coupling to the second end of the outer compartment such that the inner compartment extends through the second opening into the outer cavity. The first end of the inner compartment is positioned outside of the outer cavity when the inner compartment and the outer compartment are coupled together. The first closure is configured for coupling to the first end of the outer compartment for selectively opening and closing the first opening in the outer compartment. The first closure is configured to support the outer compartment in a generally upright manner when the first closure is placed on a generally horizontal surface. The second closure is configured for coupling to the first end of the inner compartment for selectively opening and closing the third opening in the inner compartment. The second closure is configured to support the inner compartment in a generally upright manner when the second closure is placed on a generally horizontal surface. Preferably, the first closure is substantially identical to the second closure. Preferably, the first opening of the outer compartment is accessible through the second opening of the outer compartment when the inner compartment is not coupled to the second end of the outer compartment.

The container assembly has the advantages of the other container assemblies described above. Further, either closure allows the container assembly to be supported on a surface in a stable manner for the user to access contents within the container assembly through the opening associated with the other closure that is not being used to support the container assembly.

BRIEF DESCRIPTION OF THE DRAWINGS

FIGS. 4A, 4B and 4C show partial side elevational views of an exemplary embodiment of a leak-resistant closure and configuration of an end portion of a multi-compartment container assembly in accordance with the invention described herein. In this embodiment, the closure includes internal threads (not shown) which can be screwed into engagement with external threads surrounding the aperture at one end portion of the container. FIG. 4C shows the closure.

FIGS. 5A, 5B and 5C show partial side elevational views of an alternative exemplary embodiment of a leak-resistant closure and configuration of an end portion of a multi-compartment container assembly in accordance with the invention described herein. In this embodiment, the closure includes external threads that may be screwed into engagement with internal threads (shown in dotted lines) of the aperture at one end portion. FIG. 5C shows the closure.

FIGS. 6A, 6B and 6C show partial side elevational views of a further alternative exemplary embodiment of a leak-resistant closure and configuration of an end portion of a multi-compartment container assembly in accordance with the invention described herein. In this embodiment, the closure comprises a male plug stem (optionally ribbed) that may be pushed into a female receiver (optionally ribbed on the internal perimeter of the aperture) at one end portion of the container. FIG. 6C shows the closure.

DETAILED DESCRIPTION OF PREFERRED EMBODIMENT

A container assembly in accordance with one embodiment of the invention described herein has a first end portion and an opposing second end portion. The container comprises at least two separate compartments, an outer compartment and one or more inner compartments received within the outer compartment. The outer compartment and inner compartment(s) each have an aperture. Each aperture has a separate closure for closing the aperture and thereby closing access to the compartment. Alternatively, the present container may comprise more than one inner compartment, each with its own aperture and closure. The aperture of the second or more inner compartments may be located on either the first end portion or the second end portion. The inner and outer compartments may each contain a substance, for example without limitation, a solid or liquid, that is isolated from the other, and which can be separately accessed.

The multiple compartment container assembly of the invention may have various shapes, configurations and dimensions in addition to those exemplified in the drawings. The shape of the container may be formed to allow the container to be easily grasped. It is also contemplated that the container may be shaped to accommodate placement in a carrier such as a bicycle bottle cage, or other device for holding containers containing liquid or solid substances.

The inner and/or outer compartments may be substantially rigid or may be flexible so as to be squeezable or compressible and may be formed from any suitable material such as plastic, metal or metal alloy, or a combination thereof. In one embodiment, the container is made from thermoplastic material such as polyethylene terephthalate (PET), high-density polyethylene (HDPE), co-polyester, polypropylene (PP), or other plastics conventionally used in the container art. In another embodiment, the container is made of metal, for example aluminum or stainless steel. The container may include a plastic resin or epoxy liner to protect contents from taste and odor transfer, as known in the art. If the compartment is used for a non-consumable substance, such as shampoo or conditioner, the compartment may be formed from another conventional material that is suitable for use in conjunction with such substances.

The leak-resistant closures for use with the container assembly may be removably secured to the respective aperture. The closure may be of any conventional type used in the art of containers that are intended to hold and dispense substances. For example, without limitation, the closure may have a coupling structure to attach to the aperture of the compartment, or the aperture may have its own corresponding coupling structure to attach to the closure. Other configurations are contemplated within the scope of the invention, such as, without limitation: threaded screw closures, with or without a washer-like ring, that may be configured to thread or screw on to one another; closures that may be attached via friction or snap on fit that can be pried off and replaced with pressure; and plug closures that may be inserted into an aperture. The closure may be of a type that is detached and removed to fill or dispense the contents, or may have a built in dispenser such as a threaded screw closure with a built in re-closable spout or "sports cap." The closure for use with the present invention may be made of any suitable material, such as metal, metal alloy or plastic.

The present container assembly may be manufactured, using conventional techniques in the container construction art, as one piece or as two or more pieces that are separately formed and subsequently assembled. For example, the process used for making the container depends on the size, shape and materials of the container being made. In the case where the container is rigid, suitable manufacturing processes may be appropriately chosen by a skilled person. Such processes may include, but are not limited to: injection molding, injection-blow-molding, or extrusion-blow-molding. In the case where the container is flexible, suitable manufacturing processes can again be selected by the skilled person. Such processes include, but are not limited to: extrusion-blow-molding or injection-molding. In one alternative, the container may be made by molding two separate compartments, by any suitable means, which are then assembled, using any suitable means, for example, adhesive or lock and key system of cooperating surfaces. Alternatively, if the container is made primarily of aluminum, the compartments may be produced by a mechanical cold-forming process that starts by punching a flat blank or shallow cup and drawing or drawing and ironing to form the compartments and then sealing the compartments together.

Figures 1A, 1B:
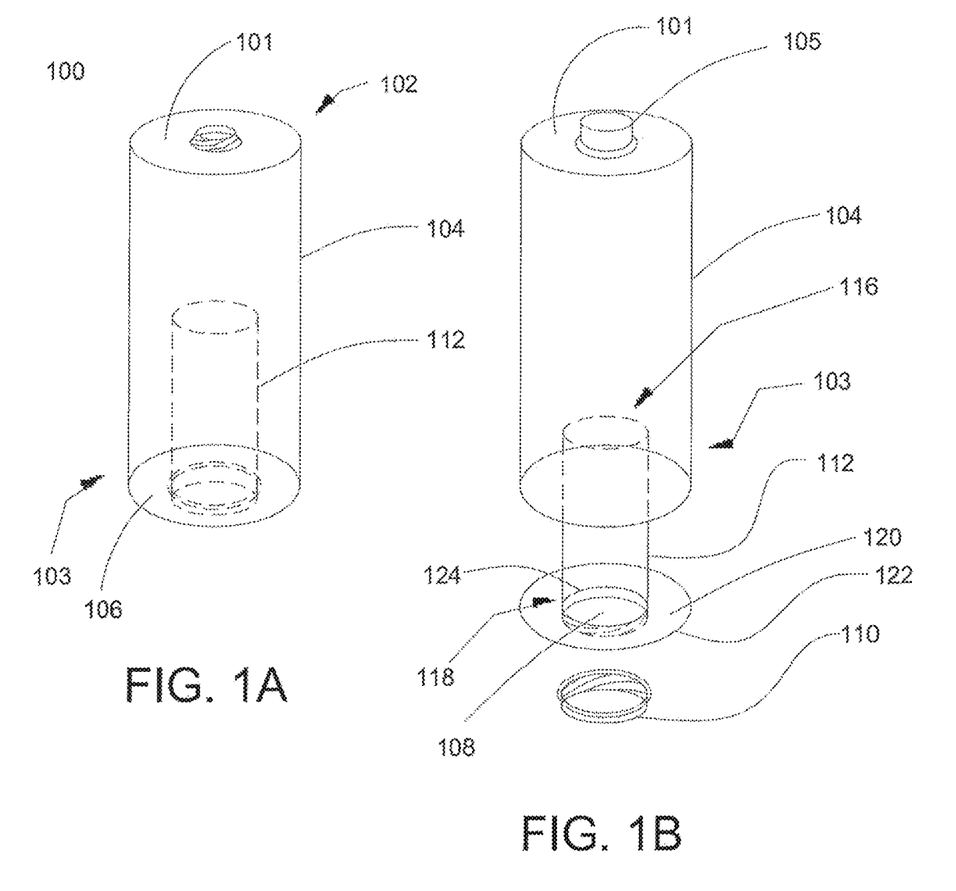
FIG. 1A is a perspective view of an embodiment of a container assembly in accordance with the invention described herein.
FIG. 1B is an exploded view of the container assembly of FIG. 1A.
Figure 1C:
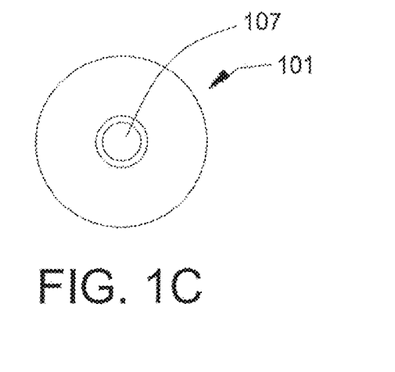
FIG. 1C is a top plan view of a first end portion of the container assembly of FIG. 1A, without a closure.
Figure 1D:
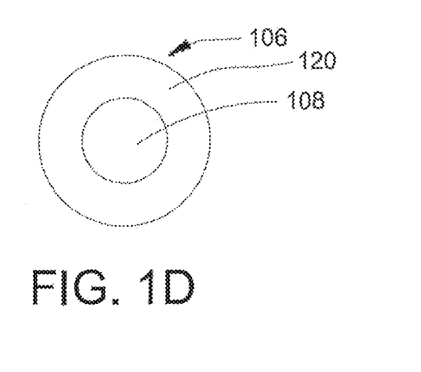
FIG. 1D is a bottom plan view of a second end portion of the container assembly of FIG. 1A, without a closure.

Referring to the drawings, FIGS. 1A-1D depict one illustrative embodiment of the container assembly 100 in accordance with principles of the present invention, wherein the container assembly 100 includes a first end portion 102 and a second end portion 103. In this embodiment the container assembly 100 comprises a generally cylindrical outer compartment 104 with a first end 101, a second end 106, and cylindrical side wall extending between the first end 101 and second end 106, which define the main cavity of the outer compartment 104. There is a first end aperture 107 in the first end 101 that accommodates a leak-resistant, first end closure 105. The first end aperture 107 opens to the outer compartment 104. The first end closure 105 shown in FIG. 1B is a threaded, screw-type closure; however, a screw-type closure is exemplary only and any leak-resistant closure may be used, as discussed above. The opposite, second end portion 103 of the container assembly 100 of FIGS. 1A-1D includes a second end aperture 108 that accommodates a leak-resistant, second end closure 110. The second end aperture 108 opens to an inner compartment 112. In this embodiment, the inner compartment 112 is generally cylindrical in shape, smaller than the outer compartment 104 and is located within the outer compartment 104. The inner compartment 112 has a closed end 116, that extends toward the first end portion 102 of the container assembly 100, a cylindrical side wall, and an open end 118 which together define the cavity of the inner compartment 112. In this embodiment, a flange 120 forms the second end 106 of the container assembly 100. The flange 120 is generally "donut-shaped" with an outer, perimeter ring 122, an inner ring 124 and a central opening, which is co-extensive with the second end aperture. The inner ring 124 of the flange 120 is attached to the perimeter of the open end 118 of the inner compartment 112. The perimeter ring 122 of the flange 120 is attached to the perimeter of the second end 106 of the outer compartment 104. In this embodiment, when the container is assembled, the open end 118 of the inner compartment 112 provides the second end aperture 108. Alternatively, the inner compartment 112 may include a flanged head at the open end that provides the flange 120. It will be recognized by one skilled in the art that a bottom flange, having other shapes, may be utilized depending on the shape of the container assembly 100. Alternatively, the second end may be closed when formed and later a hole punched through it to create the aperture.

To use the multiple compartment container assembly 100 of FIGS. 1A-1D, the user accesses his/her choice of compartments by removing the closure for the compartment. The user may then add a desired substance to the compartment through that compartment's aperture. Alternatively, the user may dispense contents from a compartment that have been previously added by removing the closure for the compartment and dispensing through the compartment's aperture. For example, the user can release or remove the leak-resistant, first end closure 105 from the first end aperture 107 and add the desired substance to the outer compartment 104. The first end closure 105 can then be replaced in the first end aperture 107 to hold the substance within the outer compartment 104. The multiple compartment container assembly 100 can then be flipped, rotated, or turned to provide access to the inner compartment 112. In a similar manner, the user may then remove or release the leak-resistant, second end closure 110, thereby providing access to the second end aperture 108 and inner compartment 112. The user may then add the desired substance to the inner compartment and replace the second end closure 110 to keep the contents within the inner compartment 112. As such, the user can have convenient access and choice of two substances within a single container assembly without mixing of substances. The above description of use is exemplary only and it will be recognized that any order of adding and dispensing is possible and likewise it may be desired to use only one of the compartments at a time.

Figure 2A:
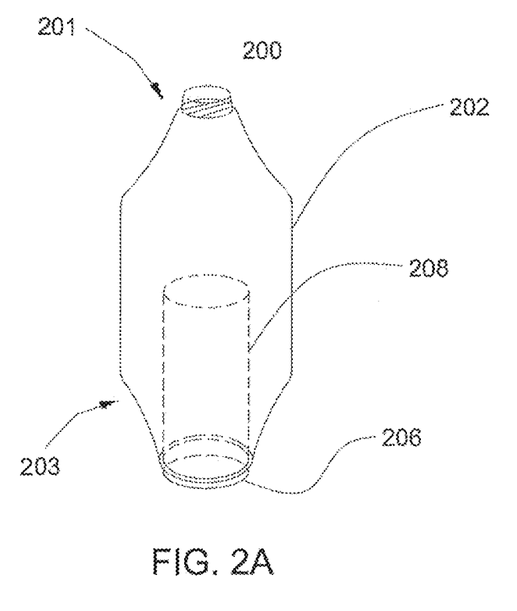
FIG. 2A is a perspective view of an alternative embodiment of a container assembly in accordance with the invention described herein.
Figure 2B:
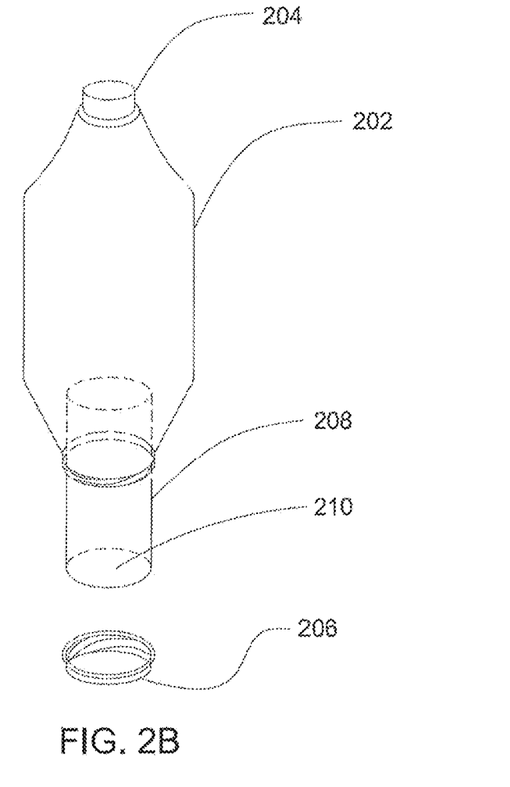
FIG. 2B is an exploded view of the container assembly of FIG. 2A.
Figure 2C:
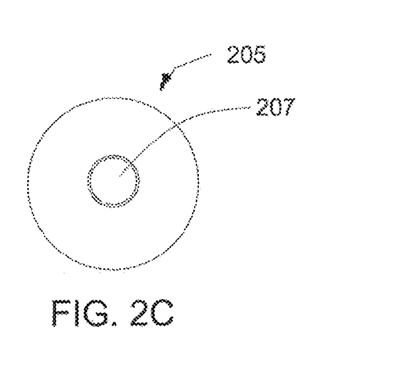
FIG. 2C is a top plan view of a first end portion of the container assembly of FIG. 2A, without a closure.
Figure 2D:
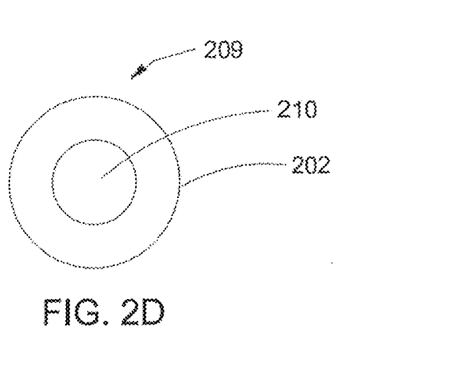
FIG. 2D is a bottom plan view of a second end portion of the container assembly of FIG. 2A, without a closure.

FIGS. 2A and 2B show another embodiment of a multiple compartment container assembly 200 in accordance with the principles of the invention described herein. This exemplary embodiment illustrates that the inner compartment 208 and outer compartment 202 may have various and/or alternative shapes, compared to the container assembly 100 shown in FIG. 1. Similar to the container assembly 100 of FIGS. 1A-1D, this container assembly 200 has an outer compartment 202 with a first end 205, a second end 209, and side walls extending between the first end 205 and second end 209, which define the main cavity of the outer compartment 202. There is a first end aperture 207 in the first end 205 that accommodates a leak-resistant, first end closure 204. The first end aperture 207 opens to the outer compartment 202. The first end closure 204 shown in FIG. 1B is a threaded, screw-type closure; however, a screw-type closure is exemplary only and any leak-resistant closure may be used, as discussed above. The opposite, second end portion 203 of the container assembly 200 of FIGS. 2A-2D includes a second end aperture 210 that accommodates a leak-resistant, second end closure 206. The second end aperture 210 opens to an inner compartment 208.

As discussed for the embodiment of FIG. 1, the embodiment of FIG. 2 may be manufactured using techniques known in the art. The use of this embodiment is essentially the same as described for the embodiment of FIG. 1.

Figure 3A:
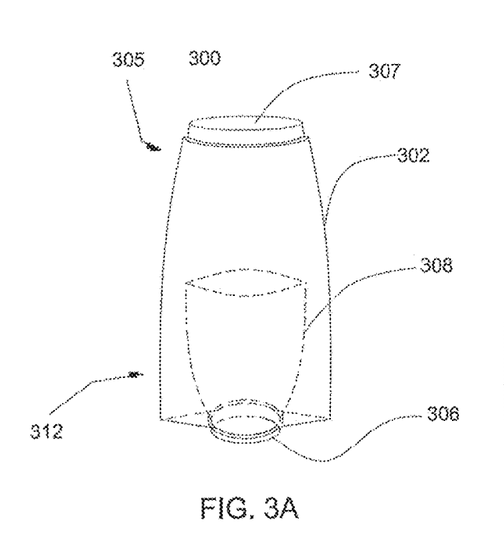
FIG. 3A is a perspective view of a further alternative embodiment of a container assembly in accordance with the invention described herein.
Figure 3B:
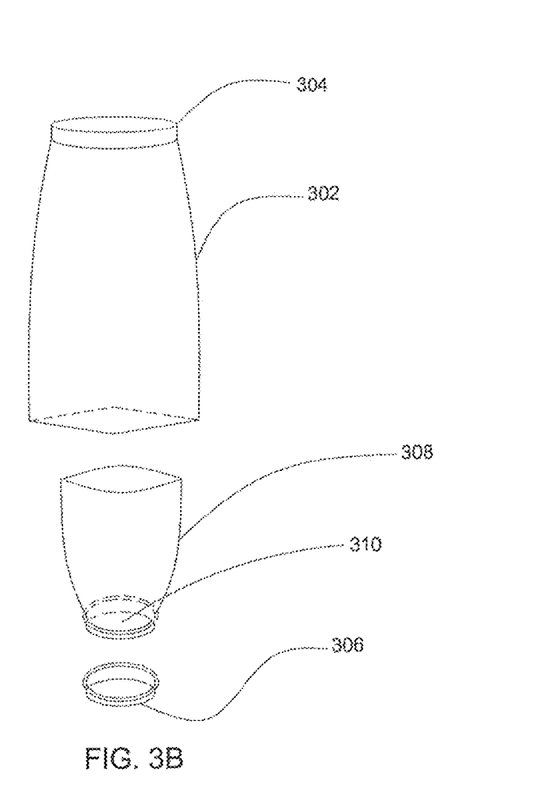
FIG. 3B is an exploded view of the container assembly of FIG. 3A.
Figure 3C:
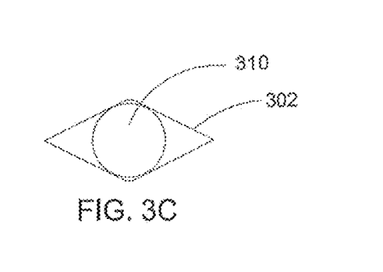
FIG. 3C is a bottom plan view of a second end portion of the container assembly of FIG. 3A, without a closure.

A further embodiment in accordance with the principles of the invention described herein is shown in FIGS. 3A-3C. This embodiment includes an outer compartment 302 and a first end portion 305 with leak-resistant, first end closure 304. This embodiment also depicts that an entire end of the container assembly may function as an aperture with leak-resistant closure. Located on the second end portion 312 of this embodiment is a second end aperture 310 and leak-resistant, second end closure 306. The second end aperture 310 opens to an inner compartment 308 which is located within the outer compartment 302. The embodiment of FIG. 3 may be manufactured using techniques known in the art. The use of this embodiment is the essentially the same as described for the embodiments of FIGS. 1 and 2.

Figure 4A:
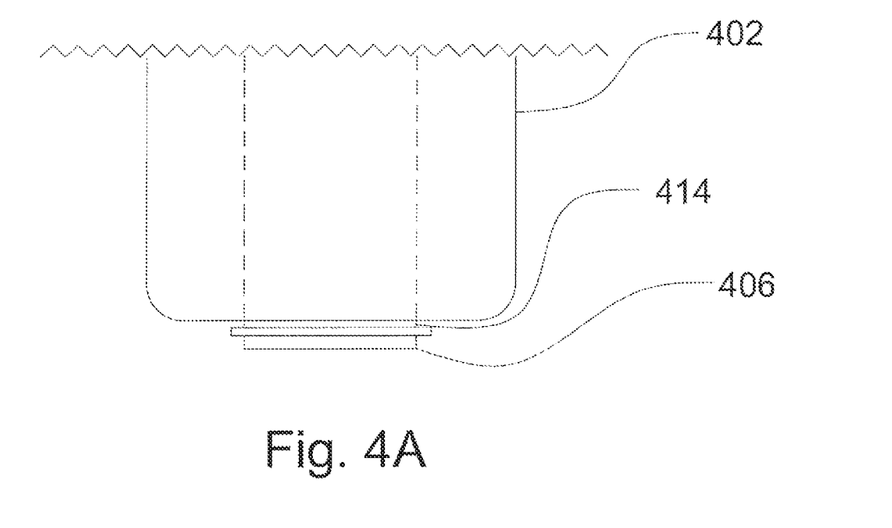
FIG. 4A shows the closure in place on the container.
Figure 4B:
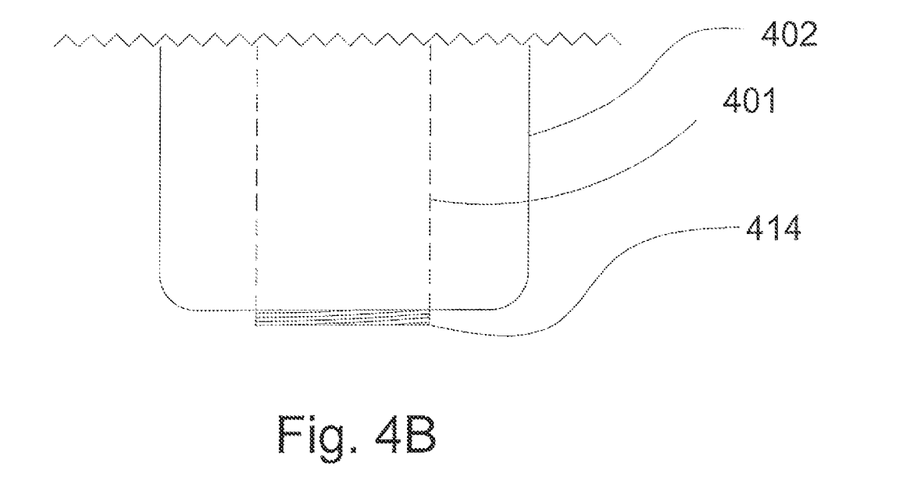
FIG. 4B shows the container without the closure.
Figure 4C:
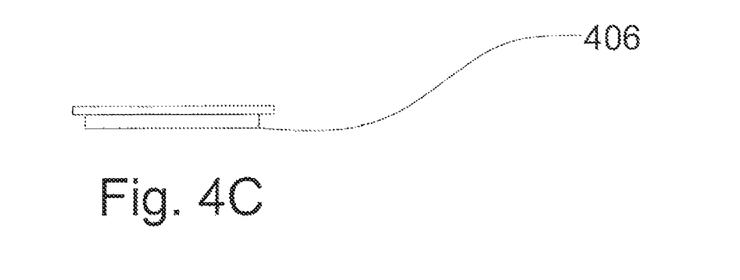

FIGS. 4A-4C show an exemplary embodiment of a leak-resistant closure that may be used in accordance with the principles of the invention described herein. The closure for the aperture of the inner compartment 401 includes a male threaded stem 414 and a female threaded cover 406 which may threadably engage the male threaded stem 414. This exemplary embodiment also depicts a closure that may act to support the container assembly on a flat surface, where the support is provided by the female threaded cover 406 for the aperture of the inner compartment 401.

Figure 5A:
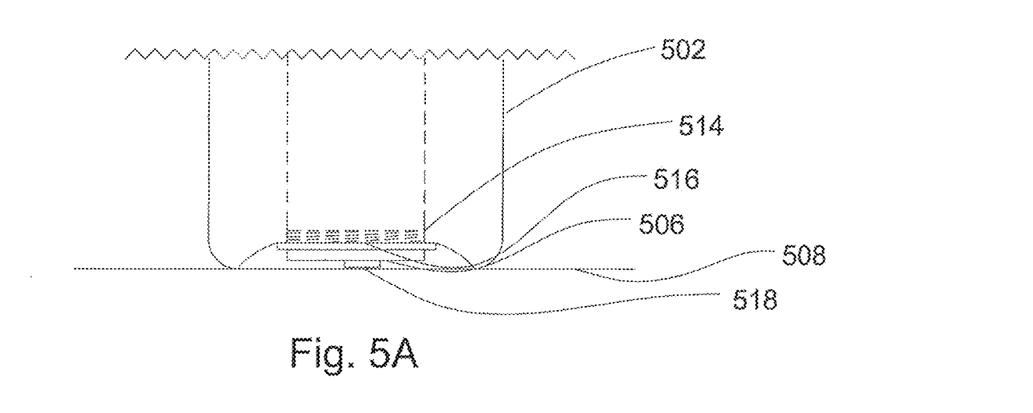
FIG. 5A shows the closure in place on the container.
Figure 5B:
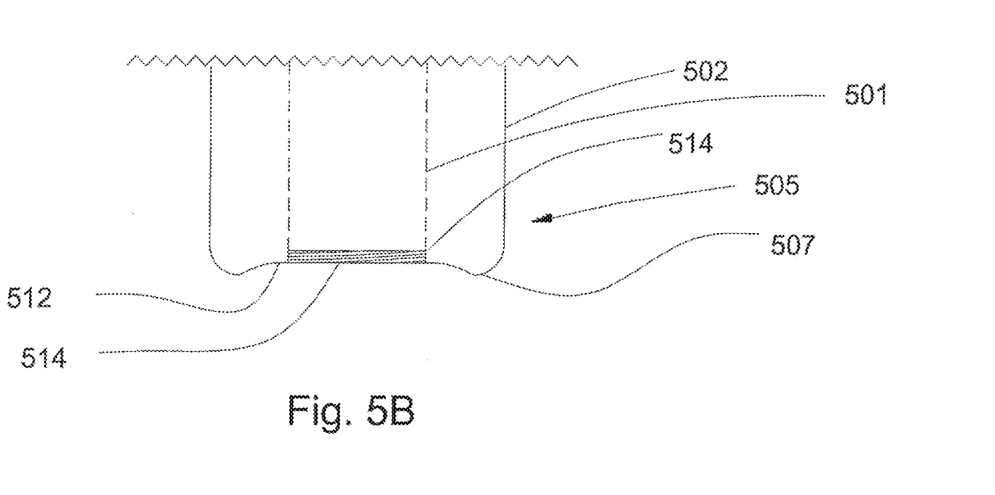
FIG. 5B shows the container without the closure.

FIGS. 5A and 5B exemplify another embodiment of a leak-resistant closure that may be used in accordance with the principles of the invention described herein. Within the perimeter of the aperture of an inner compartment 501 is a female threaded receiver 514 (shown in dotted lines). A male threaded stem 516 on a male closure cover 506 can threadably engage the female threaded receiver 514. This may be accomplished by utilization of an optional cover grip 518 located on the male closure cover 506.

Figure 6A:
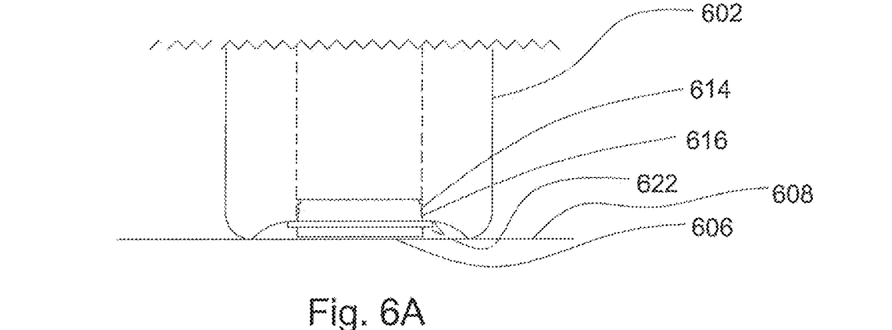
FIG. 6A shows the closure in place on the container.
Figure 6B:
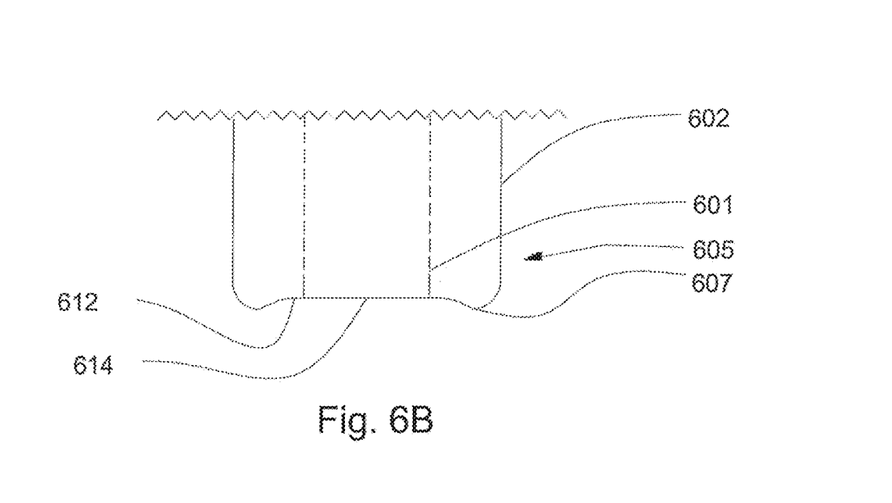
FIG. 6B shows the container without the closure.
Figure 6C:
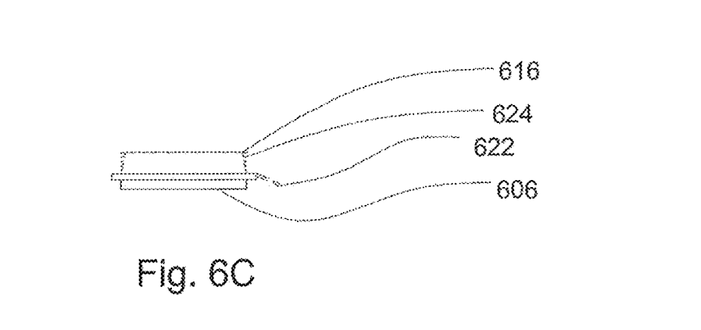

FIGS. 6A-6C show a further, exemplary embodiment of a leak-resistant closure that may be used in accordance with the principles of the invention described herein. A male plug stem 616 on a male closure cover 606 can be inserted into the aperture of the inner compartment 601 and mate with a female receiver 614 of the aperture (shown in dotted lines). Optionally, the female receiver 614 and/or the male plug stem 616 may include plug ribs 624 to assist in retention of the male plug stem 616 within the female receiver 614. Further optionally, a release tab 622 may be included with the male plug stem 616 and/or male closure cover 606 to facilitate removal of the male plug stem 616.

In use, to open the closure, the user may release the male plug stem 616 from the female receiver 614 by pulling on the male closure cover 606 or the release tab 622, if included. To close the inner compartment, the user can apply pressure to the male closure cover 606, pushing the male plug stem 616 into the female receiver 614 until a leak-resistant seal is formed between the male closure cover 606 and the inner compartment 601.

As exemplified in FIGS. 5A-5C and FIGS. 6A-6C, it is within the scope of the present invention for the container assembly to optionally include an end portion base 505 or 605 that includes a circumferential, outer ridge or rim 507 or 607, which may provide support for the container assembly when placed on a flat surface 508 or 608. Inside the outer rim 507 or 607 of end portion base 505 or 605 may be a recessed, flat surface 512 or 612. At least one aperture (not shown) may be disposed on the recessed, flat surface 512 or 612.

Figure 5C:
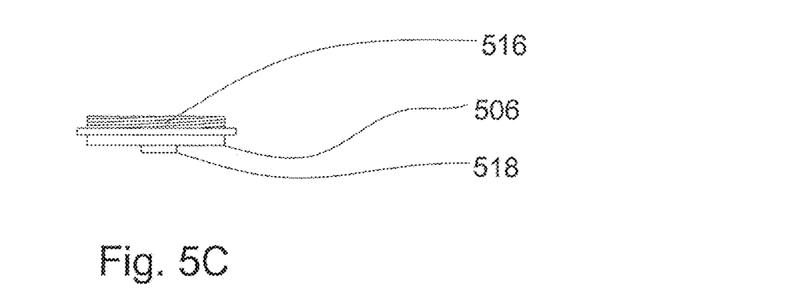

The embodiments of FIGS. 4 through 6 exemplify closures that may be used on a second end aperture for an inner compartment of the invention described herein. It should be understood that the same or similar closures, or combinations thereof, may be used to provide a leak-resistant closure for use with either first or second end apertures of the invention described herein. Those manufacturing processes known in the art may be used to produce the closures exemplified in FIGS. 4-6.

The embodiments shown in FIGS. 1 through 3 are exemplary only and the shape of the container assembly and the inner and outer compartments may be any suitable shape that will accommodate placement of an inner compartment within the outer compartment and include apertures located at the opposing end portions of the container assembly with an aperture providing access to the outer compartment and different aperture(s) providing access to the inner compartment(s). For example, the outer and inner compartment can have shapes such as rectangular, circular, oval or triangular.

Figure 7A:
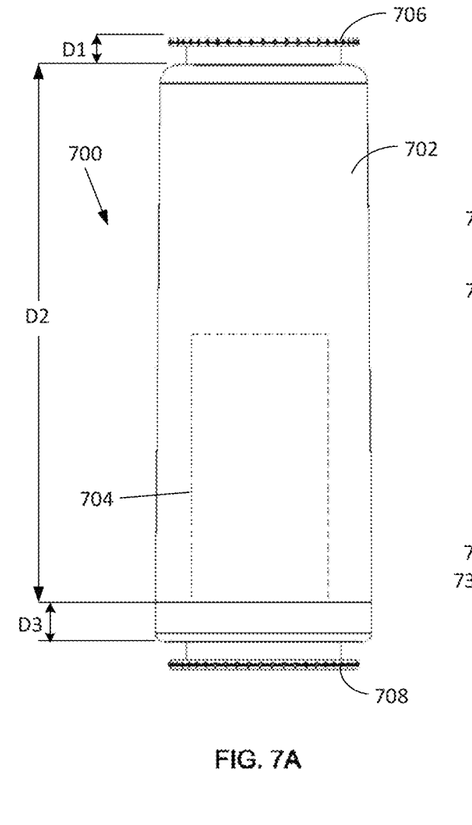
FIG. 7A is a side elevational view of a container assembly in accordance with one embodiment of the invention described herein.

Referring now to FIG. 7A, an alternative embodiment of container assembly is identified generally as 700. Container assembly 700 includes an outer compartment 702, an inner compartment 704, a first closure 706, and a second closure 708.

Figure 7B:
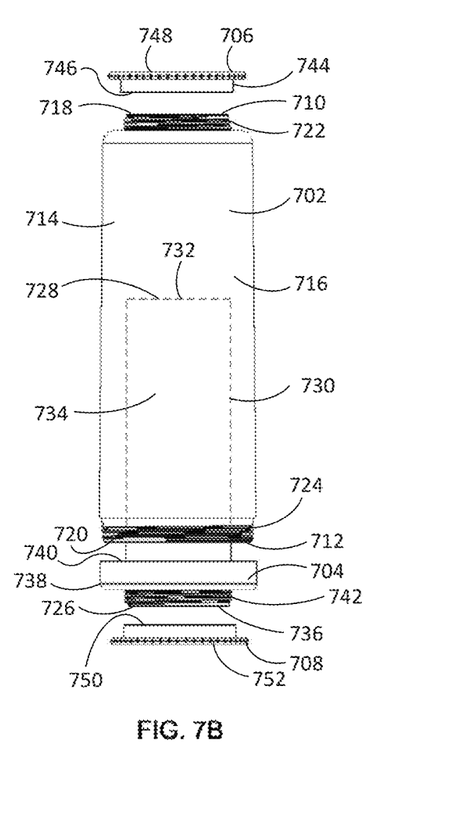
FIG. 7B is a partially exploded, side elevational view of the container assembly of FIG. 7A.

As shown in FIG. 7B, outer compartment 702 has a first end 710 and a second end 712. Outer compartment 702 has a generally cylindrical side wall 714 that extends between the first end 710 and second end 712. Side wall 714 surrounds an outer cavity 716 that is configured to receive contents, such as a fluid, gas, or dry, bulk material (e.g., fruit and/or nuts), when inner compartment 704 is coupled to outer compartment 702 as described below and shown in FIG. 1. Outer cavity 716 is accessible through a first opening 718 at first end 710 and through a second opening 720 at second end 712. A first male threaded stem 722 extends outward from side wall 714 at first end 710, and a second male threaded stem 724 extends outward from side wall 714 at second end 712. First male threaded stem 722 has an external diameter that is less than the external diameter of both side wall 714 and second male threaded stem 724.

Second male threaded stem 724 has an external diameter that is slightly less than the external diameter of side wall 714. First male threaded stem 722 extends outward from side wall 714 in a first direction that is generally aligned with a longitudinal direction of outer compartment 702, and second male threaded stem 724 extends outward from side wall 714 in a second direction that is opposite the first direction. First male threaded stem 722 surrounds first opening 718, and second male threaded stem 724 surrounds second opening 720.

Inner compartment 704 has a first end 726 and a second end 728. Inner compartment 704 has a generally cylindrical side wall 730 that extends between the first end 726 and second end 728. Inner compartment 704 has an end wall 732 that is coupled to side wall 730 at second end 728. Side wall 730 and end wall 732 surround an inner cavity 734 that is configured to receive contents, such as a fluid, gas, or dry, bulk material (e.g., fruit and/or nuts). Inner cavity 734 is accessible through a third opening 736 at first end 726. Inner compartment 704 has a flange 738 that is integrally coupled to and extends radially outward from side wall 730 adjacent first end 726. Flange 738 includes a female threaded surface 740 that is configured to removably engage second male threaded stem 724. A third male threaded stem 742 extends outward from side wall 730 and flange 738 at first end 726. Third male threaded stem 742 has an external diameter that is less than the external diameter of flange 738 and that is substantially equal to the external diameter of side wall 730. Third male threaded stem 742 extends outward from side wall 730 and flange 738 in a direction that is generally aligned with a longitudinal direction of inner compartment 704. Third male threaded stem 742 surrounds third opening 736. The dimensions of third male threaded stem 742 are preferably substantially identical to the dimensions of first male threaded stem 722.

When inner compartment 704 is coupled to outer compartment 702 via threaded engagement between second male threaded stem 724 and female threaded surface 740, the side wall 730 of inner compartment 704 extends through the second opening 720 of outer compartment 702 into outer cavity 716, and the first end 726 of inner compartment 704 is positioned outside of outer cavity 716. The threaded engagement between second male threaded stem 724 and female threaded surface 740 is preferably leak resistant to prevent fluid from leaking through second opening 720 of outer compartment 702 when inner compartment 704 is coupled to outer compartment 702. One or more seals (not shown) may also be used to seal the releasable connection between outer compartment 702 and inner compartment 704 and prevent fluid from leaking through second opening 720. Side wall 730 of inner compartment 704 has an external diameter that is less than the internal diameter of side wall 714 of outer compartment 702 such that there is a void space within outer cavity 716 between side wall 714 and side wall 730 when inner compartment 704 is coupled to outer compartment 702. Contents (e.g., fluid, gas, or dry, bulk material) placed within outer cavity 716 when inner compartment 704 is coupled to outer compartment 702 directly contact the outer surfaces of side wall 730 and end wall 732. The removable connection between inner compartment 704 and outer compartment 702 allows a user to access outer cavity 716 through second opening 720, which, along with the fact that outer cavity 716 can also be accessed through first opening 718, makes it easier to clean the surfaces of outer compartment 702 surrounding outer cavity 716. Further, first opening 718 is accessible through second opening 720 (and vice versa) when inner compartment 704 is not coupled to the second end 712 of outer compartment 702, which allows a user to access the entire outer cavity 716 through either first opening 718 or second opening 720.

Outer compartment 702 and inner compartment 704 are separate compartments with respect to each other and are configured to hold and dispense separate contents without mixing of the contents. Further, inner compartment 704 may be removed from engagement with outer compartment 702 and selectively used by itself to store contents without use of outer compartment 702. Outer compartment 702 and inner compartment 704 are preferably separately formed before being assembled, but it is also within the scope of the invention for the outer compartment 702 and inner compartment 704 to be formed as a single, integral piece. Outer compartment 702 and inner compartment 704 may be formed from any type of material including a rigid material or a flexible material. Further, while outer compartment 702 and inner compartment 704 are shown as having a generally cylindrical shape, they may have any shape including a square, triangular, oval, or rectangular shape.

First closure 706 has a cylinder 744 with an internal female threaded surface 746 and a support surface 748 (FIG. 7C) that is integrally coupled to and extends radially outward from cylinder 744. Female threaded surface 746 is configured to removably engage the first male threaded stem 722 for selectively opening and closing the first opening 718 in outer compartment 702. The threaded engagement between first male threaded stem 722 and female threaded surface 746 is preferably leak resistant to prevent fluid from leaking through first opening 718 of outer compartment 702 when first closure 706 is coupled to outer compartment 702. One or more seals (not shown) may also be used to seal the releasable connection between outer compartment 702 and first closure 706 and prevent fluid from leaking through first opening 718.

Figure 7C:
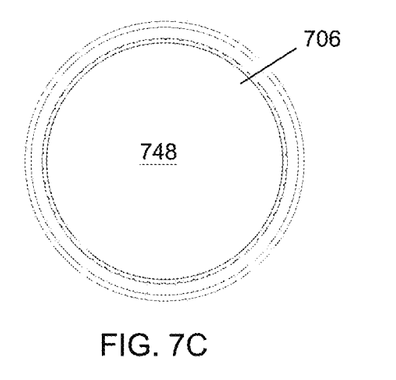
FIG. 7C is a top plan view of the container assembly of FIG. 7A.

Support surface 748, shown in FIG. 7C, is flat and generally circular with an outer diameter that is approximately the same as the outer diameter of side wall 714. The diameter of cylinder 744 is less than the diameter of support surface 748 and side wall 714, which creates an annular gap between support surface 748 and side wall 714 when first closure 706 is coupled to outer compartment 702. The gap is preferably sized so that a user may insert fingers within the gap to pick up, hold, and/or transport container assembly 700.

First closure 706 is configured to support the outer compartment 702 in a generally upright manner when support surface 748 is placed on a generally horizontal surface. First closure 706 also supports inner compartment 704 in a generally upright manner when inner compartment 704 is coupled to outer compartment 702. When support surface 748 is placed on a surface to support container assembly 700 in a generally upright manner and the remainder of container assembly 700 extends upward from support surface 748, second opening 720 is positioned at the top of container assembly 700. Third opening 736 is also positioned at the top of container assembly 700 if inner compartment 704 is coupled to outer compartment 702. Thus, when support surface 748 is placed on a surface to support container assembly 700, outer cavity 716 is accessible through second opening 720 if inner compartment 704 is not coupled to outer compartment 702 and inner cavity 734 is accessible through third opening 736 if inner compartment 704 is coupled to outer compartment 702 and second closure 708 is removed from engagement with inner compartment 704. The diameter of support surface 748 is preferably fairly large and approximately equal to the outer diameter of side wall 714 to enhance stability of container assembly 700 when support surface 748 is placed on a surface to support container assembly 700. The diameter of flange 738 is preferably between approximately 2 to 3.5 inches, and is most preferably approximately 2.75 inches. The diameter of side wall 714 is preferably between approximately 2 to 4 inches, and is most preferably approximately 3 inches.

Further, the distance D1 (FIG. 7A) between support surface 748 and side wall 714 is relatively short to enhance stability of container assembly 700 when support surface 748 is placed on a surface to support container assembly 700. The distance D1 is preferably minimized to lower the center of gravity of the container assembly 700 (and the contents placed within it) relative to support surface 748, which enhances stability of container assembly 700 and prevents it from inadvertently tipping over when support surface 748 is placed on a surface. The distance D1 is preferably between approximately 0.125 to 0.625 inches, and is most preferably approximately 0.375 inches. The overall length D2 of side wall 714 is preferably between approximately 6 to 10 inches, and is most preferably approximately 8 inches. The length D3 of flange 738 is preferably between approximately 0.25 to 0.75 inches, and is most preferably approximately 0.5 inches.

Second closure 708 is preferably substantially identical to first closure 706 and thus is not described in the same level of detail herein as first closure 706. Second closure 708 has a female threaded surface 750 that is configured to removably engage the third male threaded stem 742 for selectively opening and closing the third opening 736. The threaded engagement between third male threaded stem 742 and female threaded surface 750 is preferably leak resistant to prevent fluid from leaking through third opening 736 of inner compartment 704 when second closure 708 is coupled to inner compartment 704. One or more seals (not shown) may also be used to seal the releasable connection between inner compartment 704 and second closure 708 and prevent fluid from leaking through third opening 736.

Figure 7D:
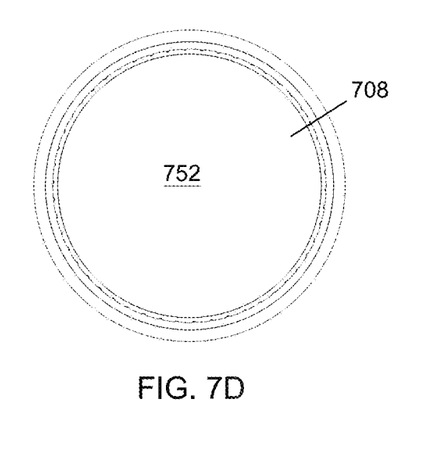
FIG. 7D is a bottom plan view of the container assembly of FIG. 7A.
Figure 7E:
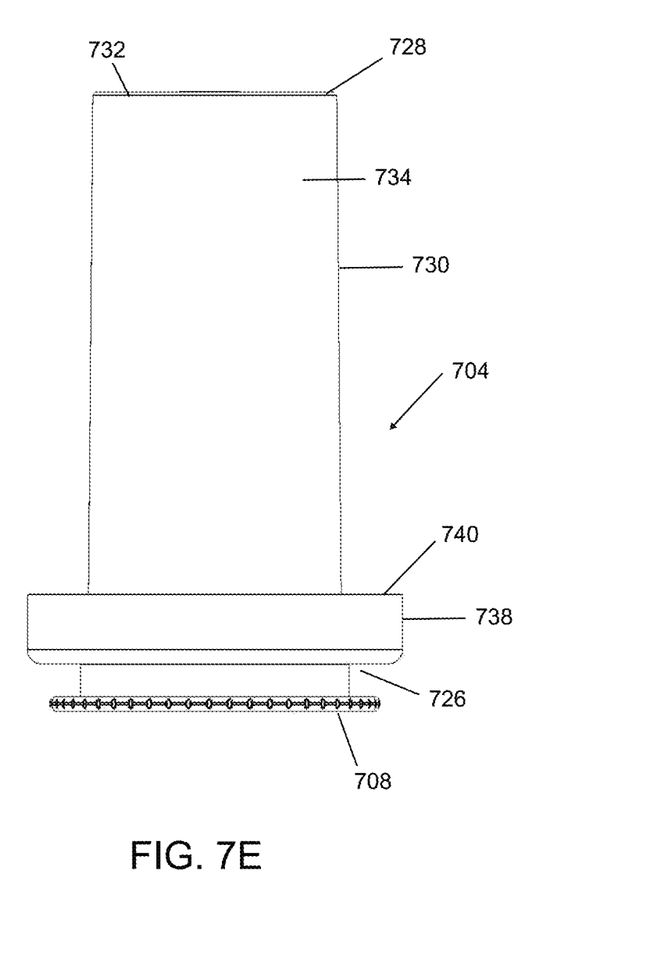
FIG. 7E is a side elevational view of an inner compartment of the container assembly of FIG. 7A.

Second closure 708 has a support surface 752 that is configured to support the inner compartment 704 (and outer compartment 702 when it is coupled to inner compartment 704) in a generally upright manner when support surface 752 is placed on a generally horizontal surface. When support surface 752 is placed on a surface to support container assembly 700 in a generally upright manner and the remainder of container assembly 700, including outer compartment 702, extends upward from support surface 752, first opening 718 is positioned at the top of container assembly 700. Thus, when support surface 752 is placed on a surface to support container assembly 700, outer cavity 716 is accessible through first opening 718 if inner compartment 704 is coupled to outer compartment 702 and first closure 706 is removed from engagement with outer compartment 702. Support surface 752 is configured to support container assembly 700 in a stable manner in the same manner as described above with respect to support surface 748. Container assembly 700 has no defined top or bottom because it can be supported on a surface using either first closure 706 or second closure 708 depending on whether the user desires to access outer cavity 716 or inner cavity 734. Since the first closure 706 and second closure 708 are substantially identical, second closure 708 may releasably engage outer compartment 702 and first closure 706 may releasably engage inner compartment 704. The same manufacturing techniques may also be used to make first and second closures 706, 708, which reduces the cost to manufacture container assembly 700.

When second closure 708 is coupled to inner compartment 704, there is also preferably an annular gap between support surface 752 and flange 738 similar to the gap described above between support surface 748 of first closure 706 and side wall 714. The gap is preferably sized so that a user may insert fingers within the gap to pick up, hold, and/or transport container assembly 700.

While first closure 706 and second closure 708 are described above and shown in the drawings as threadably engaging outer compartment 702 and inner compartment 704, respectively, it is within the scope of the invention for first closure 706 and second closure 708 to have a different structure configured to removably close first opening 718 and third opening 736, respectively. For example, first closure 706 and second closure 708 may have any structure described above in connection with other embodiments described in this application such as a plug, a coupling structure attached to the first opening 718 in the outer compartment 702 or the third opening 736 in the inner compartment 704, a threaded screw, a snap on closure, and a sports cap. Further, it is within the scope of the invention for any of the male threaded stems 722, 724, and 742 to be female threaded surfaces with the corresponding female threaded surface 740, 746, and/or 750 being a male threaded stem.

In use, container assembly 700 is used in a similar manner as described above with respect to container assembly 100. Further, inner compartment 704 may also be removed from engagement with outer compartment 702 if the user desires to use inner compartment 704 separately from outer compartment 702 or to facilitate cleaning of outer compartment 702. Container assembly 700 may be supported on a surface in a stable manner with either first closure 706 or second closure 708 abutting and resting on the support surface. With one of the closures 706, 708 resting on a support surface, the container assembly 700 may be rotated 180 degrees so that the other of closures 706, 708 may be used to support container assembly 700 on the support surface.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A container assembly comprising:
   an outer compartment comprising a first end and a second end, wherein the outer compartment defines an outer cavity that is accessible through a first opening at the first end of the outer compartment and through a second opening at the second end of the outer compartment;
   an inner compartment comprising a first end and a second end, wherein the inner compartment defines an inner cavity that is accessible through a third opening at the first end of the inner compartment, wherein the inner compartment is configured for coupling to the second end of the outer compartment such that the inner compartment extends through the second opening into the outer cavity, wherein the first end of the inner compartment is positioned outside of the outer cavity when the inner compartment and the outer compartment are coupled together, wherein the inner compartment is removably coupled to the second end of the outer compartment via a threaded engagement;

a first closure that is configured for coupling to the first end of the outer compartment for selectively opening and closing the first opening in the outer compartment, wherein the first closure is configured to support the outer compartment in a generally upright manner when the first closure is placed on a generally horizontal surface, wherein the first closure is removably coupled to the first end of the outer compartment via a threaded engagement; and a second closure that is configured for coupling to the first end of the inner compartment for selectively opening and closing the third opening in the inner compartment, wherein the second closure is configured to support the inner compartment in a generally upright manner when the second closure is placed on a generally horizontal surface, and wherein the second closure is removably coupled to the first end of the inner compartment via a threaded engagement.

2. The container assembly of claim 1, wherein the outer compartment comprises a side wall that extends between the first and second ends of the outer compartment, wherein the side wall surrounds the outer cavity.

3. The container assembly of claim 2, wherein the outer compartment comprises a male threaded stem that extends outward from the side wall at the first end of the outer compartment, and wherein the first closure comprises a female threaded surface configured to removably engage the male threaded stem.

4. The container assembly of claim 2, wherein the inner compartment comprises:
a side wall that extends between the first and second ends of the inner compartment; and
an end wall that is coupled to the side wall of the inner compartment at the second end of the inner compartment, wherein the end wall and the side wall of the inner compartment surround the inner cavity.

5. The container assembly of claim 4, wherein the inner compartment comprises a flange that is coupled to the side wall of the inner compartment at the first end of the inner compartment, wherein the flange is configured to be removably coupled to the second end of the outer compartment.

6. The container assembly of claim 5, wherein the flange is configured to be removably coupled to the second end of the outer compartment via a threaded engagement.

7. The container assembly of claim 6, wherein the outer compartment comprises another male threaded stem that extends outward from the side wall of the outer compartment at the second end of the outer compartment, and wherein the flange comprises a female threaded surface configured to removably engage the other male threaded stem.

8. The container assembly of claim 4, wherein the inner compartment comprises a male threaded stem that extends outward from the side wall of the inner compartment at the first end of the inner compartment, and wherein the second closure comprises a female threaded surface configured to removably engage the male threaded stem of the inner compartment.

9. The container assembly of claim 1, wherein the outer compartment and the inner compartment are separate compartments with respect to each other, and wherein the outer compartment and the inner compartment are configured to hold and dispense separate contents without mixing of the contents.

10. The container assembly of claim 1, wherein the first closure is configured for coupling to the first end of the outer compartment in a manner that resists leaks through the first opening in the outer compartment, and wherein the second closure is configured for coupling to the first end of the inner compartment in a manner that resists leaks through the third opening in the inner compartment.

11. The container assembly of claim 1, wherein the first closure and the second closure are selected from the group consisting of a plug, a coupling structure attached to the first opening in the outer compartment or the third opening in the inner compartment, a threaded screw, a snap on closure, and a sports cap.

12. The container assembly of claim 1, wherein the outer compartment and the inner compartment are formed as a single, integral piece.

13. The container assembly of claim 1, wherein the outer compartment and the inner compartment are separately formed before being assembled.

14. The container assembly of claim 1, wherein at least one of the outer compartment and the inner compartment is composed of a rigid material.

15. The container assembly of claim 1, wherein at least one of the outer compartment and the inner compartment is composed of a flexible material.

16. The container assembly of claim 1, wherein at least one of the outer compartment and the inner compartment comprises a cylindrical, square, triangular, oval or rectangular shape.

17. The container assembly of claim 1, wherein the first closure comprises a cylinder that is configured for coupling to the first end of the outer compartment and a support surface that is coupled to and extends radially outward from the cylinder, wherein an annular gap is presented between the support surface and the first end of the outer compartment when the first closure is coupled to the outer compartment, and wherein the annular gap is sized to receive one or more fingers of a user's hand.

18. A container assembly comprising:
an outer compartment comprising a first end and a second end, wherein the outer compartment defines an outer cavity that is accessible through a first opening at the first end of the outer compartment and through a second opening at the second end of the outer compartment;
an inner compartment comprising a first end and a second end, wherein the inner compartment defines an inner cavity that is accessible through a third opening at the first end of the inner compartment, wherein the inner compartment is coupled to the second end of the outer compartment such that the inner compartment extends through the second opening into the outer cavity, wherein the first end of the inner compartment is positioned outside of the outer cavity, wherein the outer compartment and the inner compartment are separate compartments with respect to each other, wherein the outer compartment and the inner compartment are configured to hold and dispense separate contents without mixing of the contents, wherein the first opening of the outer compartment is accessible through the second opening of the outer compartment when the inner compartment is not coupled to the second end of the outer compartment, wherein the inner compartment is removably coupled to the second end of the outer compartment via a threaded engagement;

a first closure removably coupled to the first end of the outer compartment for selectively opening and closing the first opening in the outer compartment, wherein the first closure is configured to support the outer compartment in a generally upright manner when the first closure is placed on a generally horizontal surface, wherein the first closure is removably coupled to the first end of the outer compartment via a threaded engagement; and a second closure removably coupled to the first end of the inner compartment for selectively opening and closing the third opening in the inner compartment, wherein the second closure is configured to support the inner compartment in a generally upright manner when the second closure is placed on a generally horizontal surface, and wherein the second closure is removably coupled to the first end of the inner compartment via a threaded engagement.

19. The container of assembly of claim 18, wherein the first closure comprises a cylinder that is configured for coupling to the first end of the outer compartment and a support surface that is coupled to and extends radially outward from the cylinder.

20. The container assembly of claim 19, wherein an annular gap is presented between the support surface and the first end of the outer compartment when the first closure is coupled to the outer compartment, and wherein the annular gap is sized to receive one or more fingers of a user's hand.

21. The container assembly of claim 18, wherein the first closure is configured for coupling to the first end of the outer compartment in a manner that resists leaks through the first opening in the outer compartment, and wherein the second closure is configured for coupling to the first end of the inner compartment in a manner that resists leaks through the third opening in the inner compartment.

* * * * *